United States Patent Office 3,314,907
Patented Apr. 18, 1967

3,314,907
HYDROCARBON RESIN AQUEOUS COATING COMPOSITION
Ernest T. Fronczak, Crystal Lake, Ill., assignor, by mesne assignments, to Union Oil Company of California, Los Angeles, Calif., a corporation of California
No Drawing. Filed May 22, 1963, Ser. No. 282,245
13 Claims. (Cl. 260—28.5)

This invention relates to compositions of matter, having film-forming and coating properties, adapted to be applied to the surfaces of objects. More particularly, the invention relates to a protective coating composition of the emulsion type characterized by its versatile physical properties and its adaptability to a variety of applications in the coating art, such composition containing the combination of (1) heat reactive synthetic hydrocarbon resins of petroleum origin having film-forming properties; (2) high-molecular weight viscous residual hydrocarbons of complex polynuclear aromatic, alkyl-aromatic and heterocyclic nature, as illustrated by solvent extracts obtained in the solvent extraction of mineral lubricating oil (3) one or more emulsifiers; and (4) one or more metal salt drying agents, with or without (5) an emulsifiable auxiliary bituminous film-former. A feature of this invention is the discovery that the best results are obtained using a ratio of resin (1) to solvent extract (2) in the order of about 35 to 55 parts resin to about 45 to 65 parts solvent extract to constitute 100 parts of the plasticized hydrocarbon portion of said compositions whether compounded as water-in-oil or oil-water emulsions.

The foregoing combination of ingredients may be compounded into an unctuous, non-aqueous concentrate which has certain limited utilities, e.g., can be dissolved in a compatible solvent and applied as a coating composition, or the ingredients can be compounded into an aqueous film-forming mixture or suspension with about 1% to 99% of water, or formed into a stable emulsion with about 40% to 65% by weight of water.

In the coating art countless materials and compositions have been formulated and tried for protecting surfaces of objects by forming on said surfaces a non-reactive, water- and air-impervious, corrosion-protective film having or not having lubricating properties. The principal problem in this art constitutes the attainment of a proper tenacious thin film, which provides prolonged protection of any surface, e.g., metallic parts and materials composed of metals or alloys which are subject to oxidation and corrosion during storage, periods of non-use, or periods wherein these objects are subjected to various corrosive atmospheres. Metal surfaces have been coated or treated with greases, fatty compositions, waxes, organic compounds, e.g., organic acids, amines, inorganic compounds, and various combinations of carrier fluids, film-forming ingredients, emulsifiers, plastic compositions such as pyroloxyline type films, asphaltic base varnishes, various paints and tars and the like in order to protect them against corrosion under various conditions. Some of these compositions are formulated for the purpose of giving lasting protection to the object and others are formulated for the purpose of giving temporary protection and subsequent removal.

The instant invention relates primarily to non-reactive coating compositions for any type of inanimate surface which give a substantially permanent protective coating and which can be readily replenished or reapplied after a period of time. Among the important properties of the composition of this invention is the ability to inhibit corrosion or rust after it has already started, and suitability for application over or onto the surfaces of objects which have been previously coated or painted or otherwise provided with a protective composition.

Furthermore, the composition of this invention, being of the emulsion type is versatile to the extent it can be applied to surfaces which are wetted with water, is easily applied by spraying, dipping or painting, forms a film which is flexible, will not crack, peel, slide; resists abrasion, and penetrates any corrosion residues such as rust and dirt which may be on the surface or surfaces to be protected.

A particular feature of this invention is that the compositions made thereof are adapted to provide complete protection for various metal surfaces such as automobile underbodies. In these applications, the product has been found to stop rust and corrosion of the metal or automobile underbody even when applied after such corrosion has already started, to penetrate dirt and rust accumulations in remote areas of the metal surface or automobile underbody and prevent further rusting of these surfaces, and to provide an impervious seal against the seepage of moisture, road salts, exhaust gases, and other corrosive elements. The compositions of this invention can be sprayed onto original, painted, or unpainted surfaces of the automobile underbody or over other undercoatings which have been previously applied to these surfaces.

Further particular advantages of the composition of this invention are that it may be applied as a fine spray so that it reaches into and protects areas which are inaccessible to conventional undercoatings. Such areas include the metal strip below car doors, fender wells and headlight "eye brows." The composition further eliminates the problems experienced with grease-base compositions which tend to drip onto garage floors and driveways and rub off or erode due to water splashing on the undercarriage parts of the automobile.

In addition, the composition of this invention is easily applied by spraying even while the car's underbody is still wet from washing, the wheels do not have to be removed during the application, and the material sets up rapidly so the car may be driven over wet payment or dirt in a few minutes after application. The composition of this invention is non-flammable and, being water soluble, any undried spills or overspray can be washed off with water.

Also, the compositions of this invention are of such physical character that they may be applied with low-cost spray equipment and do not require expensive high pressure spray equipment as is necessary for other types of undercoatings. Accordingly the compositions of this invention have many uses such as rust-proofing of farm equipment, garden tools and rain spouts and gutters, and water-proofing or providing the proper interstitial coating for concrete building blocks, wood, and other applications where a protective coating finds utility.

Accordingly, a primary object of this invention is to provide a protective coating composition.

Another objective of this invention is to provide a protective coating composition containing as the film-forming ingredients: (1) heat-reactive synthetic, unsaturated hydrocarbon resins of petroleum origin having film-forming properties; (2) high molecular weight viscous residual hydrocarbon of complex polynuclear, aromatic, alkyl aromatic and heterocyclic nature, as illustrated by solvent extracts obtained in the solvent extraction of mineral lubricating oil using solvent selective for aromatic compounds; (3) one or more emulsifiers; and (4) one or more metal drying agents; with or without (5) an emulsifiable auxiliary bituminous material.

Another object of this invention is to provide a method of preparing aqueous emulsions of the foregoing enumerated ingredients with small or large amounts of water adapted to form films of various desired thicknesses and surface properties.

Still a further object of this invention is to provide mulsions containing, as the emulsified or plasticized hydrocarbon portion, the mixture or reaction product of about 30% to about 40% by weight of heat-reactive synthetic, unsaturated, hydrocarbon resins of petroleum origin, about 35% to about 48% by weight of sulfur-containing complex aromatic compounds of petroleum origin, 0% to about 12% by weight of bitumen and/or other emulsifiable film-forming ingredients, as the emulsifier, the reaction product of about 4% to about 12% by weight of fatty acids, about 1% to about 3.0% by weight of an amino alkanol having a total of 1 to 5 carbon atoms, and, as the drier, about 0.1% to about 2.0% by weight of metal drier, such as metal naphthenate or metal naphthenates. A feature of this invention is to provide coating compositions wherein the ratio of resin to solvent extract is in the order of about 35 to 55% resin to about 65 to 45% solvent extract and said ratio is preferably about 45% resin to 55% solvent extract, within the plasticized hydrocarbon portion thereof exclusive of the bitumen.

Another object of this invention is to provide a stable emulsified composition containing about 10% to about 12% by weight of heat-reactive unsaturated hydrocarbon resins of aliphatic character, about 15 to about 25% by weight of sulfur-containing complex aromatic compounds of petroleum origin, 0% to about 5% by weight of a bitumen and/or other emulsifiable film-forming ingredients, about 2% to about 6% by weight of fatty acids, about 0.5% to about 1½% by weight of an amino alkanol having a total of 1 to 5 carbon atoms, about 0.05 to about 1.0% by weight of metal naphthenate or metal naphthenates, and a minimum of about 35% and preferably about 40% to about 70% by weight of water.

Another object of this invention is to provide emulsions as just described which have been modified by blending same with latex emulsions, such as 70–30 butadiene-styrene, polyvinyl acetate homopolymer, vinyl-acrylic copolymer, etc., to produce protective films with different characteristics.

These and other objects of this invention will be described or become apparent as the specification proceeds. In order to disclose and demonstrate the invention, the general classes of ingredients will be described, giving specific examples of compositions and tests made thereon.

*The resin component*

Heat-reactive resins of petroleum origin having film-forming properties to be used in accordance with this invention represent a certain class of materials known and described in the art. One type of such resin constitutes the solid, amber-colored, hard, glossy, fractionable, unsaturated resin of petroleum origin comprising long chain unsaturated hydrocarbons. These materials are produced from petroleum hydrocarbons and have iodine numbers of about 100 to 250 or 300 and melting points of about 150° to 250° F., and are insoluble in ketones and alcohols but soluble in ethers, aromatic naphthas and aliphatic naphthas, and soluble in or compatible with drying oils, semi-drying oils, non-drying oils, marine oils, vegetable oils and animal oils. The specific gravity of these resins is about 1.05 to 1.10 and the acid number is 0.0 to 2.0. Processes for preparing synthetic resins of this nature are described in the following United States Patents: 1,919,722, 1,919,723, 2,008,102, 2,008,103, 2,116,499, wherein polymerized essentially hydrocarbon products obtained from the high pressure polymerization of cracked gasolines are described. These resins are prepared by subjecting a cracked gasoline containing olefins and diolefins, from vapor phase processing, to contact with a catalytic contact mass such as diatomaceous earth, fuller's earth, clay or activated carbon under vaporizing conditions, as at temperatures of 450° F. to 750° F. and pressures dependent on the vapor pressure of the gasoline or distillate. The polymer products generally have iodine numbers between 100 and 200, with some fractions thereof exhibiting iodine numbers as high as 300 by the Wijs method, are viscous, sticky polymers having viscosities of 50 to 2000 seconds, Saybolt Universal at 210° F., and have nonvolatile contents of 75% to 95% as measured by the standard ASTM method used for testing coating materials, such as varnish. At lower polymerization temperatures, pressures and catalytic activity of the contact mass, and with shorter contact times, polymers of more unsaturated and reactive nature are produced. The catalyst may be aluminum chloride or any other catalyst having polymerization activity.

Resins having decreased solubility in petroleum naphthas and increased solubility in such solvents as furfural or alcohol are produced by oxidation of the resins at temperatures of about 150° F. to 175° F., especially in the presence of an oil-soluble siccative metallic soap. By fractionating the original gasoline to separate the first fraction having an end point not over about 235° F. and polymerizing this fraction, light colored resins are obtained. Illustrative heat-reactive resins prepared by the polymerization of olefinic hydrocarbons are the proprietary products known as Velsicol resins such as Velsicol AD–21; Velsicol AF–3 (sp. gr. 1.020–1.070, M.P. 177° F., min. Iodine No. 300–325); Velsicol AD–4 (sp. gr. 1.07–1.09, M.P. 200–220° F., Iodine No. 250 minimum, Acid No. 0–2); Velsicol AD–63 (sp. gr. 1.07–1.10, M.P. 240–250° F., Acid No. 0–2).

These resins generally have characteristics between the paraffins and asphaltenes in such properties as solubility, color and the like, being generally solids or semi-solids and balsam-like at room temperature and fluid at temperatures slightly above room temperature, and have the distinctive property of being reactable with drying oils to form varnish.

*The polynuclear compounds*

The polynuclear aromatic compounds of petroleum origin or mixtures therefrom used in accordance with this invention are solvent extracts obtained in the solvent extraction of mineral lubricating oils, this product being well known and described throughout the art. The treatment of a mineral lubricating oil with a solvent selective for aromatic compounds produces an extract which contains the complex polynuclear aromatic alkylaromatic, heterocyclic compounds, which are used as an ingredient of the coating compositions of this invention. These materials are variously described in the prior art, and are referred to as "solvent extracts from the solvent refining of mineral lubricating oil." These materials are obtained in the manufacture or either neutrals or bright stocks. The definition and description of solvent extracts used therein are established in the art, patents and literature. Only such amplification and illustrative examples thereof are given to establish the fact that all such solvent extracts from the solvent extraction of mineral lubricating oils can be used and applied to this invention.

Through chemical analysis, characterization and study of the physical and chemical properties, by way of illustration only, these complex aromatic compounds constituting solvent extracts can be represented by the following formulae:

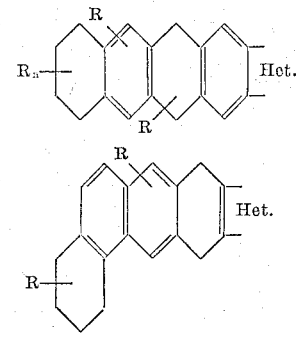

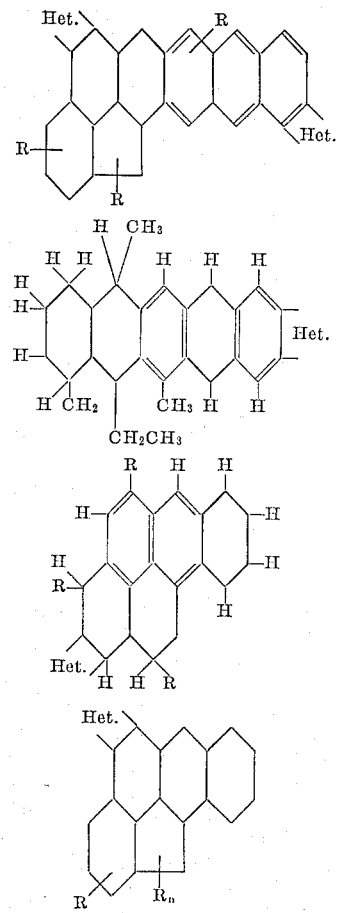

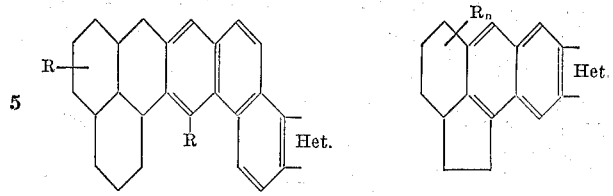

wherein "Het." illustrates one or more S-, N-, or O-containing heterocyclic ring substituents, R is an alkyl or cycloalkyl radical having a total of 5 to 22 carbon atoms for each nucleus, and $n$ has a value of 3 to 10. The molecular weight of the solvent extract ranges from about 250 to 750, and the average molecular weight is about 325–470.

Solvent extracts having molecular weights of about 300 to 600 obtained from the manufacture of bright stock and neutral lubricating oils are particular examples of extracts having highly beneficial properties in the compositions of this invention.

For example, a preferred source of the above-defined complex hydrocarbons comprises the phenol extracts obtained in phenol refining of mineral oils, particularly lubricating oil fractions. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, and is related in detail in the prior art, it is only necessary for present purposes to give some examples by way of illustration. Following are the physical characteristics of typical extract products, from lubricating oil stocks derived from various crude oils and other source hydrocarbon materials, which may be used to prepare the coating compositions of this invention.

TABLE I.—SOURCES AND PHYSICAL CHARACTERISTICS OF SOLVENT EXTRACTS

| Ext. No. | Crude Source | Solvent | API Grav. | Sp. Gr. at 10° F. | Vis./100° F. | Vis./130° F. | Vis./210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9084 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,0007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, has an average molecular weight of 300, and contained 76.8% aromatics (by the silica gel procedure).

Extract No. 42 was obtained in the production of 150 Vis. Bright Stock, has an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 Vis. neutral, has an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 Vis. neutral, has an average molecular weight of 340, contained 87% aromatics, and 13% saturates.

Extract No. 45 was obtained in the production of 160 Vis. Bright Stock, contained 92% aromatics and 8% saturates.

The solvent extracts from lubricating oils used as ingredients in the coating compositions of this invention have the following general properties and characteristics:

TABLE II

| Characteristic: | Range of value |
|---|---|
| Gravity, ° API | 7.3–18.3. |
| Gravity, sp., 60/60° F. | 0.945–1.022. |
| Viscosity SUS @ 210° F. | 40–1500. |
| Viscosity index | −128–+39. |
| Pour point (max.) ° F. | +35–+100. |
| Molecular weight, average (above 300) | 320–750. |
| Boiling point (initial) ° F. | 300–1000. |
| Boiling point (end) ° F. | 400–1200. |
| Combined sulfur percent wt. (total) | 0.5–4.5. |
| Sulfur compound percent by vol. | 20–50. |
| Aromatic compounds | 25–90. |
| Neutral aromatic hydrocarbons | 40–51. |
| Av. no. of rings/mean arom. mol. | 1.7–5.0. |

In characterizing these residual materials for use in accordance with this invention, the molecular weights, sulfur content and average number of aromatic rings per mean aromatic molecule are the selected criterion.

The complexity of the types of compounds present, as based on these analyses, is illustrated by the following table:

TABLE III.—ESTIMATED CHEMICAL COMPOSITION OF SOLVENT EXTRACTS NOS. 19, 21, 43 AND 44 OF TABLE I

| Type of compound: | Approx. percent in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 0.5 |
|   Substituted benzphenanthrenes | 0.2 |
|   Substituted pyrenes | 0.2 |
| Pentanuclear aromatics: | |
|   Perylene | 0.01 |
| Sulfur compounds *, oxygen compounds, etc. | 16.5 |

*Mainly heterocyclic compounds. The average mol. wt. of Extracts 19 and 21 is 340, and that of Extract 20 is 590.

Any portion of the complex aromatic constituents in solvent extracts may be isolated therefrom, that is, fractions of solvent extracts can be used in accordance with this invention. For example, solvent extracts may be distilled and selected fractions thereof or mixtures of selected fractions used as one ingredient. The content of complex, polynuclear, aromatic compounds and heterocyclics present in solvent extracts may vary depending on the type of solvent, the extraction process applied, and the mineral oil treated, although the general chemical types of compounds present in the extract are not so varied. Extracts from the manufacture of 150 Vis. Bright Stock containing a preponderance of higher molecular weight polynuclear aromatics and heterocyclics of aromatic nature represent a preferred type of ingredient for economic reasons.

The solvent extract ingredient may be vacuum-distilled, dewaxed and/or clay-contacted prior to use in preparing the compositions of this invention. Dewaxing can be accomplished by known methods e.g., treatment with 45% MEK and 55% toluene as the dewaxing solvent, using temperatures in the order of −10° F., and solvent/solvent extract ratios of about 8/1. This treatment results in a dewaxed extract which has a pour point of +5° F. and results in the removal of about 2% wax having a melting point of about 130° F. Clay-contacting can be accomplished by known methods.

Without limiting the invention, the characteristics of the compositions of this invention as influenced by the complex polynuclear heterocyclic compounds comprising solvent extracts are further disclosed as thus far evaluated. These complex, polynuclear, aromatic, heterocyclic materials have dihydronaphthalene, dihydrophenanthrene, and dihydroanthracene structural types, and have, in addition, several alkyl groups and/or cycloalkyl groups in each aromatic nucleus wherein the sum of the carbon atoms in the alkyl or naphthenic radical substituents varies between 5 and 22 and combined sulfur, oxygen and nitrogen in the form of heterocyclic rings in the molecule. A portion of the aromatic rings or condensed aromatic rings are probably further condensed with naphthenic rings to form configurations similar to the steroid ring systems. Solvent extracts obtained in the production of bright stocks contain more highly condensed aromatic structures.

Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04% and the oxygen content is of this same order. Analysis for the types of carbon linkages as percent $C_a$ (carbon atoms in aromatic configuration), percent $C_n$ (carbon atoms in naphthenic configuration), and percent $C_p$ (carbon atoms in paraffinic configuration), gives results ranging from about 30–40% $C_a$, 20–35% $C_n$, and 31–47% $C_p$ using the method of Kurtz, King, Stout, Partikian and Skrabek (Anal. Chem., 28, 1928 (1956)). They are soluble in ethyl ether, acetone, methyl ethyl ketone, tetrahydrofuran, benzene, toluene and xylene.

The bitumen

The bitumen which may or may not be present and, if used, is present at a concentration of about 0.1 to 5.0% by weight in the coating compositions of this invention, includes any asphaltic bitumen obtained in the refining of crude petroleum oils which preferably qualifies as a hard asphalt as determined by its penetration and softening points. The residues obtained during the distillation of crude oils or the residues obtained from acid tars in the treatment of lubricating oils with sulfuric acid can be used to prepare asphalts to be used herein. The asphaltic bitumen can also be obtained during the deasphalting of lubrication oils with solvents. These materials are normally air blown in batch or continuous processes to form hardened and bodied asphalts useful as ingredients for road building, shingle manufacture, etc.

Although hard blown asphalts are preferred, the bituminous portion of the compositions of this invention may be any such material of native (mineral, vegetable or animal) or pyrogenous (fractional distillation, destructive distillation, heating in a closed vessel or blowing with air) origin, of light to black color, of viscous, semi-solid or solid consistency, fracture either conchoidal or hackly, have a waxy, resinous or dull lustre, have adherent feel, exhibit an oily or tarry odor, be either volatile or nonvolatile and fusible or difficultly fusible. All non-mineral constituents are soluble in carbon disulfide. Chemically the bitumens to be used in accordance with this invention are hydrocarbons, oxygenated bodies, with some crystallizable paraffins and some mineral matter (inorganic substances).

This definition excludes such materials as pyrobitumens which are non-adherent and infusible; petroleum, asphaltite, asphaltic pyrobitumen, non-asphaltic pyrobitumen, tar and some of the least adherent of the pyrogenous pitches, although some or all of these materials may be present in small amounts in the bitumen used. The bitumens generally yield water-insoluble sulfonation products, may or may not contain oxygenated bodies and may or may not contain inorganic materials. Exclusion of one ingredient generally, excludes species thereunder. Thus exclusion of pyrobitumen also excludes elaterite, wurtzilite, alberite and impsonite and also the non-asphaltic pyrobitumens such as peat, lignite, bituminous coal and anthracite coal.

A preferred class of bitumens comprises asphaltic substances and pyrogenous asphaltic substances of dark color; of variable hardness; being comparatively non-volatile and adhesive; composed principally of hydrocarbons; substantially free of oxygenated bodies, except those minor amounts formed during air blowing; containing relatively little to no crystallizable paraffins; sometimes associated with mineral matter; having non-mineral constituents which are fusible, and largely soluble in carbon disulfide, and yielding water-insoluble sulfonation products. A preferred sub-genus of asphalt comprises pyrogenous asphalts such as residues obtained from the distillation, blowing, etc., of petroleum e.g. residual oil, blown asphalts, residual asphalts and sludge asphalt.

A prefered species of asphalts is blown asphalt, e.g., air-blown asphalt of petroleum origin. Air blowing is known to remove hydrogen in the form of water, form little or no oxygenated compounds, but form unsaturated hydrocarbons or intermediate anhydrides, which polymerize and form higher molecular weight materials of tough, rubber-like consistency of higher fusion-point and much more resistant to temperature changes.

Moisture to some extent is present in most native asphalts as hygroscopic moisture or in the form of an emulsion. This water is removed by the application of direct heat, the use of steam at pressures of 125 to 150 lbs., electrical immersion heaters, by contact with molten metals or alloys, by hot oil circulation, by diphenyl vapor or by circulating the asphalt itself. Agitation reduces the time of heating, e.g., by the use of jets of dry steam, jets of air or mechanical agitators, with provision to reduce frothing. Prolonged use of air is to be avoided since the fusion-point is increased.

The blown petroleum asphalts, representing a preferred sub-genus of bituminous materials are well known. They are manufactured from residual oils derived from asphaltic, semi-asphaltic or non-asphaltic petroleums, by blowing with air at elevated temperatures. The present practice is to air blow the residual oil (resulting from distillation of crude oil) at 450° to 650° F. at a rate of 30 to 3000 cu. ft. air per minute, per ton of asphalt for a period of time sufficient to give the desired properties. A catalyzer is not necessary. The more asphaltic the crude from which the residual oil is derived, the better will be the quality of the blown asphalt, and the shorter the duration of the air blowing process. Any asphalt flux can be air blown to a desired specification. Generally Gulf-Coast, Mexican heavy and Venezuela, Colombian and Trinidad crudes make the best asphalts for purposes of this invention.

Air blowing can be conducted using air alone, air under super atmospheric pressure, air followed by a mixture of steam and air in varying proportions under atmospheric or reduced pressure, carbon dioxide with or without air, or ozone, etc. Air blowing increases the fusion-point and decreases the ductility and penetration.

In general the blown asphalts when present in the compositions of this invention are black, present a conchoidal fracture, are bright to dull in lustre, have specific gravities of about 0.90 to 1.07 at 77° F., have penetrations at 77° F. of 25 to 200, exhibit consistencies at 77° F. of 2 to 30, are of variable ductility and tensile strength, have a K. and S. fusion-point of 80–400° F., an R. and B. fusion-point of 100–425° F., contain only 1% to no more than 12% of volatile matter at 500° F. for 5 hours and are 95–100% soluble in carbon disulfide. A preferred group of blown asphalts, used in accordance with this invention, exhibiting the best qualities are those having the following properties.

TABLE IV

| Property | Value | |
|---|---|---|
| | Range | Specific |
| Melting point (R. and B.) ° F | 180–200 | 197 |
| Penetration at 77° F. (100 g./5 sec.) | 20–35 | 30 |
| Ductility at 77° F. (5 cm. rate), min | 2 | 2½ |
| Soluble in CCl₄, percent | | 99.8 |
| Sp. Gr. at 77° F | 0.970–1.02 | 0.989 |

Asphalts meeting these specifications can be prepared from acid sludges or materials obtained by conventional propane deasphalting processes. The specific air blown asphalt of Table IV was obtained by air blowing a heavy residual oil from an East Texas crude at 480° F. using about 1000–3000 cu. ft. of air per ton of asphalt. Generally the air blowing of such a residual oil is carried out at temperatures of 450 to 550° F. for times sufficient to attain these physical characteristics, the treating time and air rates being selected to suit the characteristics of the particular asphalt being blown.

In addition to the foregoing, asphalts normally termed paving grade asphalts, which are generally straight run asphalts having softening points from about 100° to 130° F. and penetrations at 77° F., about 50 to about 300 dmm. may be used. Asphalts of this nature preferably possess high ductility, that is, in the order of at least 100° C. as determined by ASTM method D113–44. Most straight run asphaltic base crudes yield asphalt residues having desired ductility for use in this invention. However, certain of the mixed-base crudes which contain substantial amounts of wax are normally unacceptable for paving grade asphalts since the wax content produces low ductility. Consequently, low-wax asphalts and asphalts of the hard asphalt variety are used for purposes of this invention. The asphalt should not contain more than about 1% by weight of wax.

*The emulsifier*

Although aminoalkanol esters of tall oil fatty acids constitute a preferred genus of emulsifier for purposes of this invention, there are other materials of the same or related nature which may be used. Thus, the emulsifier may be any aminoalkanol ester of a fatty acid derived from a vegetable oil, predominating in unsaturated $C_{12}$ to $C_{26}$ fatty acids such as babassu oil, castor oil, corn oil, cottonseed oil, hempseed oil, linseed oil, mustard seed oil, olive oil, oiticica oil, peanut oil, perilla oil, poppyseed oil, rapeseed oil, safflower oil, sesame oil, soybean oil, sunflower seed oil, tung oil, and walnut oil acids. The acids are primarily lauroleic, myristoleic, palmitoleic, oleic, gadoleic, erucic, recinoleic, linoleic, elostearic licanic, arachidonic and chipanodonic acids, some of which are hydroxy-containing. Tall oil acids, making up about 45–50% of average tall oil, and of which about 48% is linoleic, 45% oleic and 7% saturated acids of the palmitic variety, are preferred as the esterifying acid mixture. Distilled tall oil fatty acids containing about 5 to 35% and preferably about 25% rosin or abietic acids form an alternative ester-forming fatty acid for use in accordance with this invention. Tall oil is the by-product obtained from the wood of conifer trees during the process of conversion of the wood fiber into cellulose by the sulfate process of Swedish process for making pulp.

The aminoalkanol used in the esterification to form the emulsifier-ester with the foregoing acids has the formula

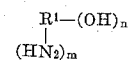

wherein $R_1$ is a divalent alkylene radical of 1 to 5 carbon atoms having straight or branched chain structure and $n$ nd $m$ are integers 1 or 2. Species of aminoalkanols include:

-amino-2-methyl-1-propanol
-amino-2-methyl-1-propanol
-amino-2-methyl-1-propanol
-amino-2-methyl-1-butanol
-amino-2-methyl-1-butanol
-amino-2-methyl-1-butanol
-amino-1-propanol
-amino-1-butanol
-amino-2-hydroxy-propane
-hydroxypropylamine
rihydroxymethylamino-methane
-amino-1,3-propanediol
-(N-methylamino)-1-ethanol
)imethylaminoethanol
-amino-2-butanol
-amino-2-butanol
-Ethylaminoethanol
-amino-1,3-butanediol
-amino-2-methyl-1,3-propanediol
-amino-1-pentanol
-amino-1-pentanol
-amino-2-pentanol
-amino-4-pentanol
-methyl-2-amino-1-butanol
-amino-3-methyl-1-butanol (valinol)
-methyl-3-amino-2-butanol
-methylamino-2-methyl-2-propanol
-isopropylaminoethanol
-dimethylamino-1-propanol
3-dimethylamino-1-propanol
l-dimethylamino-2-propanol
2-amino-2-ethyl-1,3-propanediol

*The drier*

The drier used in the compositions of this invention may be of any of a large class of metal salts known to have the properties of promoting the formation of a water-impervious film with asphaltic and/or resinous hydrocarbons. The salts of organic cyclic acids or mixtures of said salts with organic sulfonates are used in minor amounts generally not exceeding 5% and preferably in amounts of between .05% and about 1.0%. The preferred salts are the alkali, alkaline earth, and heavy metal salts of the organic acids preferably cyclic acids or alkyl cyclic acids and acids such as oleic and naphthenic acids. The cation portion of said salts may be Na, K, Ce, Ca, Ba, Sr, Mg, Al, Zn, Pb, Mn, Sn, Ge, Zr, Cr, Dc, Co, Fe, Mo, Ni, Va, Bi and the like. The anion portion of the salt of these metals is an organic acid and may be represented by the formula $$R^2(Y)_a(Z)_b(CXXH)_c$$

wherein $R^2$ is an organic or cyclic radical; the X's may be O, S, Se and/or Te; the acid radical (CXXH) being linked directly or indirectly to $R^2$; Y is a polar group; Z is an organic radical from the group consisting of alkyl, alkylene, alkylaryl, arylalkyl, alkoxy, aroxyl, aryl radical and the like; $a$ and $b$ may be zero or an integer of 1 or 2, and $c$ is an integer of 1 or 2. The substituent group represented by Y in the formula may be hydroxy, amine, nitro, nitroso, halogen, sulfo, mercapto and the like. The polar group or groups may be attached directly or indirectly to the R radical.

Specifically organic or cyclic acids may include:

Naphthenic acid (derived from petroleum hydrocarbon)
Phenyl naphthenic acid
Hydroxy-phenyl naphthenic acids
Benzyl naphthenic acids
Benzoyl naphthenic acids
Naphthyl naphthenic acids
Xenyl naphthenic acids
Phenyl-vinaconic acid
Phenyl-caronic acid
Truxillic acid
Phenyl-norpinic acid
Phenyl-finic acid
Phenyl-camphoric acid
Phenyl camphenic acid
Phenyl 2, 3, 4 trimethyl cyclopentane-3 carboxylic acid
Phenyl hexahydrobenzoic acids
Hydrophenyl hexahydrobenzoic acid
Benzyl hexahydrobenzoic acid
Phenyl hexahydrophthalic acid
Phenyl quinic acid
Hexahydrobenzoic acid
Tetrahydrophthalic acid
Hexahydrophthalic acid
Tetrahydrotoluic acid
Alkyl hexahydrophthalic acid
Alkylene cyclohexadiene carboxylic acid
Cyclohexane carboxylic acid
Cyclohexyl acetic acid
Cyclohexylbutyric acid
Cyclohexylcaproic acid
Cyclohexylpropionic acid
Cyclohexylvaleric acid
Fencholic acid
Cholic acid
Oleic abietic acid
etc.

Some specific salts of organic or cyclic acids are listed below in which any of the cations listed may be combined with any of the anion parts listed to form the salts:

| Cation: | Anion |
|---|---|
| Sodium | petroleum naphthenic acid. |
| Calcium | phenyl naphthenic acid. |
| Barium | hydrophenyl naphthenic acid. |
| Strontium | naphthyl naphthenic acid. |
| Lead | phenylfinic acid. |
| Molybdenum | oleate. |
| Tin | hydroxy petroleum naphthenic acid. |
| Manganese | phenyl hexahydrobenzoic acid. |
| Aluminum | phenyl hexahydrophthalic acid. |
| Zinc | cyclohexadiene carboxylic acid. |
| Cadmium | cyclohexylcaprioic acid. |
| Cobalt | abietic acid. |
| Germanium | phenyl camphenic acid. |
| Zirconium | phenyl quinic acid. |
| Chromium | benzyl naphthenic acid. |
| Magnesium | tetrahydrophthalic acid. |

The salts of organic acids may be replaced in whole or in part by salts of organic sulfonic acids. Sulfonates may be obtained by sulfonating various petroleum hydrocarbon fractions with sulfuric acid, oleum, chlorosulfonic acid, sulfur trioxide and their mixtures. Petroleum hydrocarbons may be treated with sulfur dioxide and a halogen and the resultant product hydrolyzed and neutralized to produce sulfonated hydrocarbons. The petroleum hydrocarbons may be aliphatic, cyclic and/or aromatic and specifically may be gas, oil, kerosene, light oil, turbine oil, mineral lubricating oil, heavy oil, petroleum waxes, petrolatum and their mixtures.

The compositions of this invention are readily prepared by mixing the ingredients in a suitable process vessel having means for indirect heating and thorough agitation. A number of known techniques for handling and blending ingredients of this nature may be applied and no special techniques or complicated apparatus are necessary to obtain the desired finished product, except as noted infra. The compositions may be prepared using continuous or batch techniques.

A preferred procedure is to blend and melt the resin and asphalt along with the solvent extract and add the driers and the fatty acids to the blended mixture. The alkanolamine is added separately in an aqueous solution to form the emulsifier. The entire mass is then diluted to the desired consistency with hot water. The product is allowed to cool for packaging at about 80° to 90° F. Samples are removed for testing of their water content, pH and Brookfield viscosity.

In the packaging and handling of the composition any spillage is easily washed away with water, but if the composition dries a hydrocarbon solvent such as Stoddard Solvent or kerosene must be used to remove the dried material.

The following examples illustrate the composition and processing technique.

To prepare the composition for use as an automotive undercoating the following ingredients are used for a 4000-lb. batch.

TABLE V

| Formulation | Lbs. | Weight percent |
|---|---|---|
| Resin | 665.6 | 16.04 |
| Solvent extract from mfg. of 150 high V.I. Bright Stock | 813.6 | 20.34 |
| Hard Asphalt | 184.8 | 4.62 |
| Tall oil fatty acids | 177.2 | 4.43 |
| 2-amino-2-methyl-1-propanol | 42.4 | 1.06 |
| 24% Lead naphthenate | 18.4 | 0.46 |
| 6% Cobalt naphthenate | 4.8 | 0.12 |
| 6% Manganese naphthenate | 4.8 | 0.12 |
| Water | 2,088.8 | 52.21 |
| Total | 4,000.0 | 100.00 |

A steam jacketed grease kettle equipped with a turbine driven agitator was charged with the resin, solvent extract and hard asphalt. Steam was applied to the steam jacket of the kettle and when the temperature reached about 200° to 220° F. the ingredients were melted sufficiently to start the agitator. Heating was continued until the mixture was at a temperature of about 265° to 275° F. At this point the steam was shut off and agitation continued to allow the mixture to cool gradually.

The water, about 281 gallons, was charged to a separate clean, insulated and covered weighing tank. The water was heated to a temperature of about 205° to 210° F. with a steam lance. The 2-amino-2-methyl-1-propanol and 23 lbs. of water were weighed out in a steel drum equipped with a spigot and the solution was heated to a temperature of about 200° to 205° F.

When the resin-alphalt mixture in the grease kettle had cooled to a temperature of about 255° to 260° F. the tall oil fatty acids were added, followed by the lead, cobalt and manganese naphthenates. Agitation of the mixture in the kettle was continued until the temperature reached about 225° to 230° F. at which point the hot amine-water solution was added slowly while agitation was applied at the top r.p.m. of the turbine driven agitator while avoiding splashing. It was found that best results are obtained if the mixture is maintained at a temperature of about 225° to 230° F. before starting the addition of the hot amine-water solution.

The mixture in the kettle was then agitated until of uniform consistency and the water was added at a temperature of about 205° to 210° F. while allowing the mixture to cool gradually. After the addition of all of the hot water, the temperature of the product in the kettle was maintained at about 180° to 185° F. Samples were removed and heated in an oven at a temperature of 275 to 300° F. to constant weight to determine the water content. Adjustments in water content to maintain the 52% level can be made at this point in the process. Cold water was run into the jacket of the kettle to bring the emulsion to a packaging temperature of about 80° to 90° F. and the product was drawn off into shipping containers.

The resin used in the foregoing example was a proprietary product known as Velsicol AD-21 resin, same being a heat reactive hydrocarbon resin of petroleum origin. This resin had the following properties:

TABLE VI

| Property: | Value |
|---|---|
| Melting point (ball and ring) | 200–220° F. |
| Form | Friable, clear solid. |
| Color | Deep reddish brown. |
| Iodine No. | 220 minimum. |
| Saponification No. | 0 to 2.0. |
| Acid No. | 0 to 2.0. |
| Specific gravity | 1.07 to 1.09. |

The solvent extract used in the foregoing example was extract No. 42 of Table I obtained in the preparation of 150 High VI Bright Stock by phenol extraction. The hard asphalt used in the foregoing example exhibited the following properties:

TABLE VII

| Property: | Value |
|---|---|
| Softening point (ball and ring) | 180 to 200° F. |
| Penetration at 77° F. (100 b./5 sec.) | 20–35. |
| Flash point C.O.C. ° F. | 450 minimum. |

Although a wide variety of fatty acids can be used to prepare the compositions of this invention, the particular fatty acid used in the foregoing example was a proprietary product known as Unitol ACD acids, same being tall oil acids having the following composition and properties:

TABLE VIII

| Composition and properties: | Typical |
|---|---|
| Rosin acids, wt. percent | 0.6 |
| Fatty acids, wt. percent | 98.8 |
| Unsaponifiables, wt. percent | 0.6 |
| Acid No. | 199 |
| Saponification No. | 199 |
| Iodine No. | 133 |
| Saturated acids, wt. percent | 2.2 |
| Titer, ° C. | 0.2 |
| Color, Gardner | 4 |

The amino alcohol used to prepare the fatty acid salt emulsifier was 2-amino-2-methyl-1-propanol (isobutanolamine) which is water white (waxy when solid), has a sp. gr. of 0.934, 20°/20, M.P. 30–31° C. and a boiling point of 165° C. (329° F.).

The reactive film-forming agents or driers used in the example were lead, cobalt and manganese naphthenates. The water used should be relatively pure, that is free of substances which cause difficulty in emulsion formation. For this purpose a condensate or demineralized water was used.

This invention contemplates the inclusion of about 0.1 to about 10% by weight of latex in the composition, for which purpose there are a number of latices available. All of these materials are chain monomers (polymers), chains of different monomers (copolymers), terpolymers and elastomers (rubber-like long chain polymers) of styrene-butadiene, butadiene-acrylonitrile and vinyl chloride copolymers having varied ratios of reactants. Where it is desired to increase the toughness and rubbery qualities of the coating the rubber latices formed from butadiene-styrene copolymers are useful. This is illustrated by the proprietary products known as Pliolite rubbers including, but not limited to, Pliolite Latex 2000, a butadiene/styrene copolymer with a 50/50 monomer ratio and relatively low solids content, Pliolite Latex 5300 and 5301, a butadiene/styrene copolymer with a 50/50 monomer ratio and higher solids content, exhibiting more adhesive properties and body, Pliolite Latex 2107, a cold polymerization product of butadiene/styrene having good tack and low-temperature flexibility and Pliolite Latex UP-100, a terepolymer of vinyl-pyridine, styrene and butadiene, having metal adhesion and the property of being free from cracking.

Because the synthetic latexes are blended most readily when already emulsified with water, best results are obtained by blending the emulsified resin-hydrocarbon-emulsifier-drying agent composition with emulsified latex. For example, where room temperature film-forming properties are to be enhanced or maintained along with adhesion, good aging properties and the like, the Pliolite Resin Latices, such as Pliolite Latex 176, a water dispersion of styrene/butadiene copolymer, Pliolite Latex 140, a 60/40 styrene/butadiene copolymer, and Pliolite Latex 170, a copolymer emulsified in an ammonium soap system, can be used.

Oil and solvent resistance and abrasion resistance can be maintained and enhanced by adding about 0.1 to about 10% of a group of butadiene/acrylonitule copolymers known as Chemigum Latex 235 CHS, a high nitrile content 55/45 butadiene/acrylonitrile copolymer, and such others as Chemigum Latex 236, Chemigum Latex 245 B, Chemigum Latex 245 CHS, Chemigum 246 (a medium nitrile counterpart of Chemigum Latex 236) and Chemigum Latex 247, to the instant compositions.

In order to demonstrate the utility of the compositions of this invention a number of tests have been conducted.

2 _____ 32.08% heat reactive hydrocarbon resins.
13.67% solvent extract from Br. Stk. mfr.
4.57% tall oil fatty acids.
1.37% 2-amino-2-methyl-1-propanol.
0.08% cobalt naphthenate (6.0%*).
48.23% water.

3 _____ 10.80% hard asphalt (180°–200° F. S.P.).
10.80% heat reactive hydrocarbon resin.
8.40% linseed oil-phthalic alkyd.
66.50% V. M. & P. naphtha.
3.50 1,1,1-trichloroethane.

4 _____ Rubber base (latex) emulsion type containing about 32% non-volatiles.

\* The percentage indicates the amount of metal (cobalt) in the salt, same being supplied in an inert carrier liquid, i.e., a volatile or non-volatile inert solvent.

NOTE.—Compositions No. 1 and 4 of Table IX are proprietary products while compositions 2 and 3 are experimental in nature to test the efficacy of using certain resins and certain sulfur-containing petroleum by-products, in combination, as film-formers.

The results are as follows:

TABLE X

| Test Vehicles | Total Test Mileage | Metal loss, Microinches | | | | | | | | | |
|---|---|---|---|---|---|---|---|---|---|---|---|
| | | Uncoated Probe | | No. 1 Coated Probe | | No. 2 Coated Probe | | No. 3 Coated Probe | | No. 4 Coated Probe | |
| | | 10 Days Period | 7 Wks. Period | 10 Days Period | 7 Wks. Period | 10 Days Period | 7 Wks. Period | 10 Days Period | 7 Wks. Period | 10 Days Period | 7 Wks. Period |
| A | 4,145 | 29 | 49 | 11 | 3 | 3 | 6 | 6 | 3 | 4 | 0 |
| B | 2,934 | 31 | 128 | 22 | 43 | 12 | 19 | 16 | 12 | 12 | 11 |
| C | 2,243 | 19 | 120 | 13 | 19 | 17 | 8 | 16 | 11 | 16 | 11 |
| D | 697 | 23 | 101 | 26 | 3 | 16 | 5 | 16 | 9 | 25 | 1 −5 |
| E | 2,430 | 24 | 95 | 25 | 24 | 24 | 26 | 22 | 48 | 23 | 49 |

[1] Apparent gain.

The compositions used, the test conditions and the results are hereinafter described.

*Automotive undercoating field tests*

In an initial series of tests a number of metal strips made from steel stock were coated with a thin film obtained by dipping in four different compositions. Each test strip was mounted on a holder adapted to be connected into an electronic corrosion-rate-measuring instrument for accurate determination of the corrosion weight by the resistance-comparative method after exposure to corrosive conditions. The holders and coated metal strips, along with uncoated strips, were mounted under the fenders of five different automobiles. One car was operated in Illinois and four were operated in Minnesota for a period of 80 days.

The compositions employed in these tests were of the following general types:

TABLE IX

Composition No.: Composition (wt. percent)
1 _____ 29–31% wax, M.P. 175° F.
69–71% hydrocarbon solvent (BR 170°–365° F., flash 125° F.

For the 10-day period these results indicate some irregularities in the degree of protection. It was found that metal strips dipped in a composition are not adequately coated because the film thickness is inadequate and the coverage, particularly at the sharp edges, was not complete. When the strips are exposed to the conditions under the fender of a vehicle, the coating on the edge of the metal strip is apparently easily ruptured, exposing the metal to the corrosive materials found on the roadway. Consequently the probes for Car No. 1 were applied by allowing a first coat to dry about 24 hours before applying a second coat, which was allowed to dry 48 hours before the tests. Thus the corrosion rates for Car A are less. Most of the corrosion took place on the edges of the strips on Cars B, C, D and E. The test results at the end of the 7 weeks' period show substantial protection with the time of exposure on the road being a contributing factor rather than total time lapse for the tests.

At the end of 81 days for Car A and 86 days for Cars B–E the following results were obtained:

TABLE XI.—CORROSION DATA

| Duration of Test, Days | Car | Uncoated | | Comp. No. 1 | | Comp. No. 2 | | Comp. No. 3 | | Comp. No. 4 | |
|---|---|---|---|---|---|---|---|---|---|---|---|
| | | Total Loss in μ Inches | Corrosion Rate, in./hr. | Total Loss in μ Inches | Corrosion Rate, in./hr. | Total Loss in μ Inches | Corrosion Rate, in./hr. | Total Loss in μ Inches | Corrosion Rate, in./hr. | Total Loss in μ Inches | Corrosion Rate, in./hr. |
| 81 | A | 190 | 0.05 | 3.6 | 0.002 | 3.6 | 0.002 | 3.6 | 0.002 | Nil | 0.003 |
| 86 | B | 220 | 0.1 | 57.6 | 0.03 | 16.8 | 0.008 | 27.6 | 0.01 | 6 | 0.004 |
| 86 | C | 205 | 0.1 | 4.8 | 0.002 | 12 | 0.006 | Nil | | 8.4 | |
| 86 | D | 143 | 0.07 | 3.6 | 0.002 | No Data, Broken Probe | | 21.6 | 0.01 | Nil | |
| 86 | E | 218 | 0.1 | 45.6 | 0.02 | 40.8 | 0.02 | 72 | 0.03 | 3 | 0.001 |

The results of the brine solution tests indicate that the corrosion rates of probes (test strips) coated with the compositions of this invention are significantly lowered as compared with uncoated strips. These results also show that the compositions of this invention protect pre-rusted metal surfaces as well as clean metal strips. The corrosion rates of the coated pre-rusted and clean strips show that a specific corrosion inhibitor is not required and not effective in the compositions of this invention under these conditions.

To further evaluate coating compositions the following test compositions were prepared for use in brine tests.

TABLE XIV.—FLEXIBILITY OF COATINGS
[ASTM D-1010 at 77° F. and −20° F.]

| Air Dried Coating (20 Hrs.) | | Air Dried (66 hrs.) and Oven Cured Coating | |
|---|---|---|---|
| Flexibility at 77° F. | Flexibility at −20° F. | Flexibility at 77° F. | Flexibility at −20° F. |
| No cracking. No flaking. No loss of adhesion. | Fine hairline cracking along bent area. Slight flaking. Slight loss of adhesion. | No cracking. No flaking. No loss of adhesion. | No cracking. No flaking. No loss of adhesion. |

TABLE XII.—UNDERCOATING PRODUCTS USED IN BRINE TESTS

| Composition weight percent | No. 6 | No. 7 | No. 8 |
|---|---|---|---|
| Heat reactive HC resin | 22.81 | 22.81 | 23.22 |
| Solvent extract from mfr. of 150 Bright Stock | 13.76 | 13.76 | 13.77 |
| Hard asphalt | 4.62 | 4.62 | 4.62 |
| Corrosion inhibitor | 0.42 | 0.42 | |
| Tall oil fatty acids | 4.23 | 4.23 | 4.23 |
| 2-amino-2-methyl-1-propanol | 1.26 | 1.26 | 1.26 |
| 24% Pb naphthenate | 0.45 | 0.45 | 0.45 |
| 6% Co naphthenate | 0.12 | 0.12 | 0.12 |
| 6% Mn naphthenate | 0.12 | 0.12 | 0.12 |
| Water | 52.21 | 52.21 | 52.21 |

The corrosion inhibitor used in Composition No. 6 was a proprietary product known as Duomeen TDO while the corrosion inhibitor in Composition No. 7 was a proprietary product known as NaSul BSN.

On conducting the brine tests the metal strips, coated and uncoated, were immersed in a salt solution for 30 days at 77° C. Both pre-rusted and clean non-corroded metal strips were used. The results are shown in Table XIII.

TABLE XIII.—BRINE UNDERCOATING TEST

| Probe | Coating | Corrosion rate, μ in./hr. |
|---|---|---|
| 10 (Rusted) | No. 6 | 0.2 |
| 11 (Rusted) | No. 7 | 0.3 |
| 12 (Rusted) | No. 8 | 0.1 |
| 13 (Rusted) | No. 6 | 0.2 |
| 14 (Rusted) | Bare | 9.0 |
| 15 (Clean) | No. 6 | 0.1 |
| 16 (Clean) | No. 7 | 0.1 |
| 17 (Clean) | No. 8 | 0.1 |
| 18 (Clean) | No. 6 | 0.2 |
| 19 (Clean) | Bare | 5.1 |

In order to further evaluate the utility of the compositions of this invention a series of film flexibility tests were performed, using the composition shown in Table V and compounded in accordance with the procedure set forth in connection with said composition. The tests were conducted using the procedure for testing asphalt emulsion coatings under ASTM D-1010-58 given in ASTM standards on paint, varnish, lacquer and related products. Tin plate test panels measuring 4" x 6.5" were sprayed with the emulsion of this inveniton, and air-dried at room temperature or cured in an oven. Each determination was conducted using several panels in groups, i.e., air dried for 20 hours, air dried for 66 hours and oven cured 2-4 hours at 210° to 220° F. and 8-12 hours at 220-275° F. The finished coated panels were then subjected to bending tests at 77° F. and −20° F. wherein the panels were individually bent 180° in a time interval of 2 seconds over a ½" mandrel according to the test procedure. The results are shown in Table XIV.

It is apparent that when the coating compositions of this invention are air-dried for 20 hours and subjected to the bending test at room temperature, they are resistant to cracking, flaking and loss of adhesion. Rapid cooling of the coated panel from room temperature to −20° F. followed by bending caused some fine hairline cracks in the coating parallel to the bend, slight flaking and some loss of adhesion. This is a severe test. Those panels that were air-dried for 66 hours or oven cured prior to bending showed no evidence of cracking, flaking or loss of adhesion either at room temperature or after rapid cooling to −20° F. This is also a severe test. None of the panels displayed any evidence of cracking, or loss of adhesion due to chilling before bending. When the bent and slightly cracked panels were warmed up to room temperature the hairline cracks appeared to have healed or "self-sealed." Thus, after 20 hours of air-drying at room temperature the coat was soft enough to "flow" and heal or fill in the fine cracks developed by bending at −20° F. Aging of the coating appears to improve the low temperature flexibility.

The compositions of this invention may contain other additives or ingredients where particular properties require emphasis. Thus, a corrosion inhibitor, though not required to pass such static tests as the brine test described herein, may be used where the coating is subjected to abrading conditions such as are encountered on the fender panels of an automobile or truck or other vehicle where the metal surfaces to be protected are subjected to the abrasive action of cinders, gravel, ice particles and the like. Accordingly, where the compositions are required to pass the salt fog spray test, the inclusion of a corrosion inhibitor is warranted because in this test the test metal panels are scribed (scratched to the bare metal surface with a sharp instrument) and tests are made of the migration of corrosion from the bare metal to the coated metal.

Corrosion inhibitors or rust inhibitors to be used for this purpose are added in an amount necessary to reduce the rate of corrosion to the minimum required in accordance with the economic dictates of the application made of the compositions. For this purpose about 0.001 to 1% or as high as 3% by weight of any hydrocarbon-soluble inhibitor may be used. Examples of rust and corrosion preventatives are alkylamine and cycloalkylamine salts of acid phosphate diesters, alkylammonium naphthenates, amino salts of organic phosphates, diaminomethane derivatives, diethanolaminomethyl-di-tert-amyl phenol, N-amino-dicarboxylic acids cetyldimethylammonium phenylstearate, dicyclohexylammonium xylylstearate, n-octadecylammonium stearate, lead naphthenate, lead oleate, barium octadecylbenzene sulfonate and the like.

The compositions of this invention may also contain coloring agents, dyes and pigments to include spirit and hydrocarbon soluble dyes, lakes and toners, organic pigments, inorganic pigments, phthalocyanines, dispersed dyes, basic dyes, zinc chromate, chrome orange, molybdate orange, nickel-azo, strontium yellow, iron oxide, chromium oxide, chrome green, ultramarine, cobalt blue, titanium dioxide, zinc oxide, antimony oxide, channel black, lamp black, oil-soluble azo dyes, anthrequinones, aluminum powder and the like.

The emulsifier portion of the compositions is likewise subject to variation within the scope of this invention, to include both cationic, anionic and nonionic surfactant or detergent types. Although the aminoalkanol esters of tall oil acids, as discusses supra, are preferred, substantially equivalent results are obtained by such surfactants and detergents as N-octadecyl disodium sulfosuccinamate
Tetrasodium N-(1,2-dicarboxyethyl-N-octadecylsulfosuccinate
Diamyl sodium sulfosuccinate
Sulfonated alkyl ester
Fatty alcohol ethylene oxide condensate
Sodium salt of sulfate esters of an alkyl phenoxyethylene ethanol
Ammonium salt of sulfate ester of an alkyl phenoxyethylene ethanol
Polyoxyethylated alkyl phenol
Sorbitan monolaurate
Sorbitan monopalmitate
Sorbitan monostearate
Sorbitan monooleate
Sorbitan sesquioleate
Sorbitan trioleate
Polyoxyethylene sorbitol ester
Polyoxyethylene sorbitan ester
Polyoxyethylene lauryl ether
Dimethyl-steramidopropyl-2-hydroxyethyl ammonium dihydrogen phosphate
Coconut-amine condensate
Quaternary morpholinium salts and the like.

Variations in the compositions of this invention are illustrated by the following illustrative examples:

COMPOSITION NO. 9

| Ingredient: | Weight percent |
|---|---|
| AD-21 resin | 16.51 |
| Solvent extract No. 43 | 20.24 |
| Hard asphalt | 4.62 |
| Acosix acids | 4.66 |
| 2-amino-2-methyl-1-propanol | 1.06 |
| 24% Pb naphthenate | 0.46 |
| 6% Co naphthenate | 0.12 |
| 6% Mn naphthenate | 0.12 |
| Water | 52.21 |
| | 100.00 |

In Composition No. 9 the tall oil fatty acids used were a proprietary product known in the trade as Acosix-Tall oil acids containing 25% rosin acids (abietic), 73% fatty acids, 2% unsaponifiables, on a wt. percent basis. These acids have an Acid No. of 190, Saponification No. 192, Idine No. 139, contain 1–2% saturated acids, exhibit a Titer °C. of 1.0 and a Gardner color of 5–6. These ingredients when blended in accordance with this invention form a stable oil-in-water emulsion which when applied to a surface quickly forms a protective coating of lasting quality.

The following compositions illustrate variations in water content that may be employed in order to cast coatings of different thicknesses having special applications:

VARIATIONS IN WATER CONTENT

| Ingredient | Composition No. (weight percent) | | |
|---|---|---|---|
| | 10 | 11 | 12 |
| AD-21 resin | 34.47 | 20.73 | 0.3482 |
| Solvent extract | 42.13 | 25.41 | 0.4256 |
| Hard asphalt | 9.58 | 5.80 | 0.0967 |
| Tall oil acids | 9.18 | 5.85 | 0.0927 |
| 2-amino-2-methyl-1-propanol | 2.21 | 1.33 | 0.0222 |
| 24% Pb naphthenate | 0.95 | 0.58 | 0.0096 |
| 6% Co naphthenate | 0.24 | 0.15 | 0.0025 |
| 6% Mn naphthenate | 0.24 | 0.15 | 0.0025 |
| Water | 1.00 | 40.00 | 99.0000 |
| Total | 100.00 | 100.00 | 100.00 |

Composition No. 10 is a water-in-oil emulsion while Composition No. 12 is an oil-in-water emulsion and Composition No. 11 is a stable homogeneous mixture, each of said compositions having utilities in accordance with this invention.

Table XV illustrates further compositions that have been prepared and used to coat metal panels and found to form a lasting protective coating.

TABLE XV

| Ingredient | Composition (wt. percent) | | | |
|---|---|---|---|---|
| | 13 | 14 | 15 | 16 |
| AD-21 resin | 14.14 | 16.31 | 18.19 | 14.0 |
| Hard asphalt | 3.93 | 4.52 | | |
| Solvent extract from 150 B.S. mfg. | 17.29 | 19.94 | 22.23 | 18.0 |
| Tall oil fatty acid | 3.77 | 4.34 | 4.30 | 3.75 |
| 2-amino-2-methyl-1-propanol | 0.90 | 1.04 | 1.03 | |
| Trihydroxymethylaminomethane | | | | 0.99 |
| 24% Pb naphthenate | 0.39 | 0.45 | 0.45 | 0.40 |
| 6% Co naphthenate | 0.10 | 0.11 | 0.11 | 0.10 |
| 6% Mn naphthenate | 0.10 | 0.11 | 0.11 | 0.10 |
| Water | 44.38 | 51.18 | 50.74 | 63.26 |
| Pliolite 5352 | 15.00 | | | |
| Rustmaster CH 358 | | 2.00 | | |
| Aluminum powder | | | 2.84 | |
| Total | 100.00 | 100.00 | 100.00 | 100.00 |

In Composition 13 the Pliolite 5352 is a proprietary latex emulsion containing 69% solids formed by the reaction of a 70/30 ratio of butadiene-styrene and emulsified in 31% water. Using 15% of this emulsion with the balance of the ingredients produced an overall composition containing 10.35% of solids (70/30 butadiene-styrene and 4.65% additional water and emulsifier combination).

Composition No. 14 contained a proprietary product known in the trade as Rustmaster CH 358 which is a phenolic penetrating liquid that improves the wetting and adhesion of the coating products and also aids in reducing corrosion. Composition No. 15 contained no bitumen and was pigmented with aluminum powder to form an emulsified paint for any surface, particularly metal surfaces. Test metal panels coated with compositions No. 9, 11, 13, 14 and 15 when exposed to the out-of-doors for periods of from 4 weeks to 6 months have shown no signs of deterioration in the coating or rusting of the metal surfaces.

The proportions and types of ingredients of the compositions of this invention are subject to some variation as has been illustrated and other ingredients may be used, than those disclosed, without departing from the spirit of the invention. The ratios of resin to solvent extract are critical to the extent of maintaining the flexibility and adhering qualities of the coating, particularly for coating metal surfaces. Higher concentrations of resin to solvent extract such as 55% resin and 45% solvent extract (based on the non-aqueous portion of the compositions) tends to increase the hardness and brittleness of the coatings, which properties may be desired for some applications. Likewise composition containing higher percentages of solvent extracts, such as 35–40% resin and 60–65% solvent extract form coatings which are tackier and have more of a tendency to sag. In some applications those compositions containing higher concentrations of solvent extracts can be made more tacky and sag-free by incorporating a filler such as glass powder as is used in fiber glass coatings.

It is to be understood that any unrefined vapor phase cracked gasoline having an initial boiling point of about 90° F. and an end boiling point of about 410° F. (Engler) may be used to prepare, by polymerization, the resins used as an ingredient of this invention. The entire cracked gasoline may be treated or the heavier constituents thereof may be removed by distillation prior to polymerization. Thus the 90°–410° F. cracked gasoline may be fractionated and the first cut comprising about 25% of the whole, having an end point (Engler of about 235° F. and a color of about +16 Saybolt, passed to the polymerization reaction, i.e., in contact with active clay at 175° F. for about one minute. The vapors together with the liquid condensate formed by the polymerization reaction are allowed to cool until about 10% of the original mass of unrefined vapor phase cracked gasoline has condensed as the liquid resinous hydrocarbon polymer. Lighter materials may be distilled from this liquid product, by the use of steam or vacuum distillation for example, until the residue has a viscosity at 100° F. of about 175 (Saybolt Universal). This residue is a transparent yellow liquid, which, upon exposure as a thin film to air, acquires a tackiness in a short time and dries within a few hours. The proprietary products used to demonstrate this invention are prepared in this or like manner.

In one aspect of this invention the film-forming hydrocarbon portion may be dissolved in a suitable stable, inert, solvent other than an aqueous emulsion for some applications, e.g., dissolved in any concentration, up to the solubility limits or about 55% by wt. in any aromatic, paraffinic or synthetic solvent. Suitable solvents include toluene, the xylenes, hexane, heptane, V. M. and P. naphtha, halogenated hydrocarbons, e.g., 1,1,1-trichloroethane, 1,1,2-trichloroethane, methylene chloride, ketones, ethers, esters and the like, particularly if the coating is to be applied by means of a vaporizing propellant or aerosol. Propellants that may be used in packaging such compositions, which may also contain a corrosion inhibitor in combination with the plasticized hydrocarbon portion, are the proprietary compounds known as Freon–11 (trichlorofluoro-methane, B.P. +74.8° F.), Freon–12 (dichlorodifluoro-methane, B.P. −21.6° F.), Freon–114 (1,2-dichlorotetrafluoroethane, B.P. +38.4° F.), mixtures of Freon–11 and Freon–12, and such other propellants as dimethyl ether to form the aerosol package.

Another aspect of this invention is the replacement of part of the hydrocarbon resin or solvent extract or both, by a drying oil. The proportion of drying oil, when used, may be from 0.1 to 10% based on the total composition. Any of the group of known liquid fats which absorb oxygen and become hard and resinous may be used for the purpose of augmenting the films cast by the compositions of this invention. Examples are the glycerides of unsaturated fatty acids to include linoleic and linolenic acids, e.g., linseed oil, poppy seed oil, tung oil, hempseed oil, safflower oil, soybean oil, sunflower oil, perilla oil and burdock oil, which do not give the elaidin reaction and contain relatively small amounts of glycerides of saturated fatty acids. These drying oils may be used with other synthetic resin-forming agents such as phthalic alkyd as are known in the art. The amount of the drying oil is adjusted to impart the desired properties to the film.

This invention is also directed to the method of compounding the ingredients disclosed herein to form various coating compositions. When preparing the solvent solutions it is necessary to heat the plasticized hydrocarbon ingredients, with or without the bitumen, to a temperature of about 200° to 300° F. or higher to form a melt, which is then taken up in the solvent as is, depending on the boiling point of the solvent, or cooled and gradually mixed with the solvent. In preparing the emulsions it is necessary to employ hot emulsification techniques wherein the melt, at a temperature of about 200° to 300° F. or preferably 255° to 260° F. is first mixed with the fatty acids, e.g., the tall oil acids and the drier. This mixture is stirred and allowed to gradually cool to a temperature of about 220° to 240° F. and preferably about 225° to 230° F., at which point a mixture of the aminoalcohol in water at a temperature of about 190° to 215° F. is added. This aqueous mixture is preferably slowly added at a temperature of about 200° to 205° F. with maximum agitation, i.e., in a grease kettle. Best results are obtained when the melt is maintained at a temperature of about 225° to 230° F. before starting the addition of the hot amine-water solution.

The mixture is then agitated until of uniform consistency and the balance of the water, added as hot water at a temperature of about 205° to 210° F., is gradually incorporated while allowing the mixture or emulsion at this point, to gradually cool until it reaches a temperature of about 170° to 195° F. or preferably about 180° to 185° F. Adjustments of the water content, based on analyses, are made at this point, before the emulsion is cooled and packaged. By adding the ingredients in a heated state to the melt it has been found that no emulsification difficulties are encountered and a stable product is obtained. The slow addition of the hot ingredients allows a gradual lowering of the overall temperature. The amounts of fatty acid and amino-alcohol added, where the emulsifier is formed in situ, are at least stoichiometric so that a neutral (pH 7.0) emulsion is formed. Preferably about 0.01 to 1.0% excess amino-alcohol, based on the acid content, is added to bring the pH on the alkaline side, e.g., a pH of about 7.1 to 10.0 and preferably about pH 8.5. In using other emulsifiers, not formed in situ, suitable adjustments in the pH are made by known techniques using a small amount of aqueous alkali in heated condition to adjust the pH to at least the neutral and preferably the alkaline side.

One form of the finished product for use as a metal coating is a fluid emulsion, having a tan color (without pigments), containing about 48% non-volatiles, having a pH of about 8.5, which is storage stable above 32° F. The fluid emulsion, in one embodiment weighs about 8.45 pounds/gallon and the dry film is dark brown (without pigments), air dries in 30–40 minutes, is tack free in 6 to 8 hours, exhibits no chipping or pealing at temperatures of −20° F. or lower and does not sag when air dried or oven dried for 8 hours at 140° to 145° F. or higher. The dry coating on metal burns only in the area of a welding torch flame.

The embodiments of this invention in which an exclusive property or privilege is claimed are as follows:

1. A coating composition consisting essentially of about 10% to about 22% by weight of a heat-reactive unsaturated hydrocarbon resin derived from the polymerization of cracked gasoline hydrocarbons and characterized by the following properties:

| Property: | Value |
|---|---|
| M.P. (ball and ring) | 200–220° F. |
| Form | Friable, clear solid. |
| Iodine No. | Approximately 220 min. |
| Saponification No. | 0 to 2.0. |
| Acid No. | 0 to 2.0. |
| Sp. gr. | 1.07–1.09. | about 15% to about 25% by weight of solvent extract obtained in the solvent extraction of mineral lubricating oil using a solvent selective for aromatic compounds and characterized by being complex, high molecular weight, polynuclear, heterocyclic, sulfur-containing compounds, about 40% to about 70% of water and a sufficient amount of an emulsifying agent from the group consisting of an aminoalkanol ester of tall oil fatty acids and an aminoalkanol ester of vegetable oil fatty acids to form a stable emulsion.

2. A coating composition in accordance with claim 1 containing about 0.1 to 5.0% by weight of a fusible bitumen, the non-mineral constituents of which are soluble in carbon disulfide.

3. A coating composition in accordance with claim 2 in which said bitumen is a hard asphalt having a softening point of about 180° to 200° F. a penetration at 77° F. (100 g./15 sec.) of 20–35 and a C.O.C. flash point of about 450° F. min.

4. A coating composition in accordance with claim 1 in which said emulsifying agent is an aminoalkanol ester of a fatty acid having 1 to 5 carbon atoms in the aminoalkanol portion and 12 to 26 carbon atoms in the fatty acid portion of the molecule.

5. A coating composition in accordance with claim 4 in which said fatty acid is tall oil acid.

6. A coating composition in accordance with claim 5 in which said tall oil acids contain from about 0.6% to about 35% rosin acids.

7. A coating composition in accordance with claim 1 containing about 0.05% to about 2.0% by weight of a metal salt of an organic acid as drying agent.

8. A coating composition in accordance with claim 7 in which said metal salt is a metal naphthenate.

9. A coating composition in accordance with claim 7 in which said metal salt comprises a mixture of lead naphthenate, cobalt naphthenate and manganese naphthenate.

10. A coating composition in accordance with claim 1 containing up to about 10% by weight of synthetic latex emulsion.

11. An emulsified coating composition as defined in claim 1 having the following composition:

| Ingredients: | Amount (wt. percent) |
|---|---|
| Heat reactive HC resin | about 14 to 22. |
| Solvent extract from 150 B.S. mfr. | about 12 to 23. |
| Hard asphalt | about 0 to 5. |
| Tall oil fatty acids | at least about 4. |
| 2-amino-2-methyl-1-propanol | at least about 1. |
| 24% pb naphthenate | about 0.4. |
| 6% Co naphthenate | about 0.1. |
| 6% Mn naphthenate | about 0.1. |
| Pigment | up to about 3. |
| Water | balance. |

12. An emulsified coating composition as defined in claim 1 comprising the following ingredients:

| Ingredients: | Amount (wt. percent) |
|---|---|
| Heat reactive HC resin | 16.64 |
| Solvent extract from 150 B.S. mfr. | 20.34 |
| Hard asphalt | 4.62 |
| Tall oil fatty acids (about 25% rosin acids) | 4.43 |
| 2-amino-2-methyl-1-propanol | 1.06 |
| 24% Pb naphthenate | 0.46 |
| 6% Co naphthenate | 0.12 |
| 6% Mn naphthenate | 0.12 |
| Water | 52.21 |

13. The composition of claim 1 in which the solvent extract has a molecular weight of about 300 to 750, contains about 0.45 to 4.5 weight percent of combined sulfur and has about 1.7 to 5.0 aromatic rings per mean aromatic molecule.

References Cited by the Examiner

UNITED STATES PATENTS

| | | | |
|---|---|---|---|
| 2,550,371 | 4/1951 | Naps et al. | 260—28.5 |
| 3,027,342 | 3/1962 | Kemp et al. | 260—28.5 |
| 3,137,583 | 6/1964 | Bryam et al. | 260—33.6 |
| 3,193,519 | 7/1965 | Gessler et al. | 260—41 |
| 3,235,522 | 2/1966 | Carr | 260—28.5 |
| 3,243,390 | 3/1966 | Hillard et al. | 260—82 |

OTHER REFERENCES

Piccopale Penn Industries Chem. Co., 11 pages, 260/82, August 1959.

MORRIS LIEBMAN, *Primary Examiner.*

J. S. WALDRON, J. FROME, *Assistant Examiners.*